United States Patent [19]

Barthel

[11] 3,850,817

[45] Nov. 26, 1974

[54] DRILLING FLUID

[75] Inventor: Horst Barthel, Hamburg, Germany

[73] Assignee: Verwaltungsgesellschaft m.b.H. Oil Base Germany, Hamburg, Germany

[22] Filed: May 19, 1972

[21] Appl. No.: 255,130

[30] Foreign Application Priority Data

May 22, 1971 Germany.............................. 2125550

[52] U.S. Cl. ............................ 252/8.5 B, 252/8.5 A
[51] Int. Cl.............................................. C10m 3/04
[58] Field of Search............ 252/8.5 A, 8.5 B, 363.5; 106/58

[56] References Cited

UNITED STATES PATENTS

| | | | |
|---|---|---|---|
| 2,789,949 | 4/1957 | Scotty................................. | 252/8.5 |
| 2,828,258 | 3/1958 | Thompson........................... | 252/8.5 |
| 2,856,356 | 10/1958 | Weiss et al.......................... | 252/8.5 |
| 3,046,221 | 7/1962 | Dodd.................................. | 252/8.5 |
| 3,307,625 | 3/1967 | Johnson et al...................... | 252/8.5 |

FOREIGN PATENTS OR APPLICATIONS

| | | | |
|---|---|---|---|
| 583,016 | 9/1959 | Canada............................... | 252/8.5 |

OTHER PUBLICATIONS

Bulian et al., German Application 1020585, printed Dec. 12, 1957, (Kl 5a 31/20)

*Primary Examiner*—Herbert B. Guynn
*Attorney, Agent, or Firm*—Arnold, White & Durkee

[57] ABSTRACT

An improved drilling fluid contains magnesium carbonate and an ammonium salt, preferably ammonium chloride. Calcium hydroxide may be added to adjust the pH-value of the drilling fluid to a pH between about 8.0 and about 12.0. The drilling fluid may also contain additional salts and protective colloids.

8 Claims, No Drawings

DRILLING FLUID

BACKGROUND OF THE INVENTION

1. Field of the Invention

The present invention relates to deep drilling fluids or muds and more particularly to aqueous deep drilling fluids containing inexpensive natural or synthetic magnesite in place of mangesium oxide MgO and/or magnesium hydroxide $Mg(OH)_2$, to a process of making such drilling fluids, and to a method of using same in deep drilling.

2. Description of the Prior Art

Aqueous drilling fluids used in drilling oil, gas, or other deep wells and containing, in place of clay which is capable of swelling, magnesia in the form of magnesium oxide MgO and/or magnesium hydroxide $Mg(OH)_2$ of natural or synthetic origin are known. Preferably a highly reactive, finely divided magnesia especially of a particle size of less than about $100\mu$ and a bulk weight lower than 600 g./l. is used for this purpose. However, such type of magnesia, although it has proved to be highly effective, has the disadvantage that it is relatively expensive. Heretofore, efforts to find a less expensive magnesia of at least about the same activity, have been unsuccessful.

SUMMARY OF THE INVENTION

It is one object of the present invention to provide a deep drilling fluid containing a magnesia substitute which is quite inexpensive but at least as effective as the heretofore used highly particulate magnesium oxide.

Another object of the present invention is to provide a simple and effective process of making such a relatively inexpensive, highly effective deep drilling fluid.

Still another object of the present invention is to provide a method of using such a deep drilling fluid for deep drilling.

Other objects of the present invention and advantageous features thereof will become apparent as the description proceeds.

In principle the present invention comprises the use of a deep drilling fluid which contains as magnesia substitute the inexpensive, natural or synthetic magnesite $MgCO_3$ in place of the highly expensive finely particulate magnesia. In order to render such magnesite useful as ingredient of deep drilling fluids, an ammonium salt and preferably ammonium chloride must be added when compounding the deep drilling fluid.

The amount of ammonium salt, such as ammonium chloride, is dependent on the amount of magnesite present in said deep drilling fluid. At least about one mole of ammonium salt such as ammonium chloride should be available for three moles of magnesium oxide (present in the form of magnesite). Preferably a proportion of four moles of magnesium oxide to one mole of an ammonium salt such as the chloride is used for carrying out the present invention.

In contrast to drilling muds based on clay, the magnesite containing drilling fluid of the present invention has the advantage that no coagulation of the magnesite or the magnesium hydroxide formed therefrom on drilling, can take place since magnesite or, respectively, the magnesium hydroxide formed therefrom are not coagulated by polyvalent electrolytes. Furthermore, the water binding capacity of the fluid is preserved and thus the water loss on drilling is reduced and controlled.

The known drilling muds based on clay have the further disadvantage that, on drilling through gypsum or anhydride deposits, such deposits are readily decomposed and thus require a very high addition of protective colloids. In contrast thereto a drilling fluid containing magnesite according to the present invention is stable on contact with gypsum or anhydride and its water binding power is improved.

Furthermore, a drilling fluid according to the present invention containing magnesite not only protects the clays of the deposits which are drilled through, against swelling but, in addition thereto, precipitates the clays by coagulation and thus increases the permeability in the immediate neighborhood of the drill hole in case clays of deposits worthy of being mined are involved.

Preferably substantially saturated aqueous solutions of magnesium chloride and sodium or potassium salts such as sodium chloride or potassium chloride, or even calcium chloride, magnesium sulfate, or the like salts are used as aqueous deep drilling fluids. Such concentrated aqueous solutions of magnesium chloride and sodium chloride are required in order to drill, for instance, through salt deposits or salt veins which consist of rock salt or mixed salts. The sodium chloride present in the drilling fluid prevents dissolution of the salt deposit by the drilling fluid and enables satisfactory drilling through the salt deposit without endangering the drill hole.

Addition of a protective colloid to the magnesite containing drilling fluid according to the present invention does not affect its rheological properties and its liquid flow limits as when using drilling fluids based on clay. Preferred protective colloids are fully condensed or cured urea-formaldehyde resins because they are not affected by magnesium ions even at high temperatures.

It is not yet known which reaction takes place when adding magnesite to the drilling fluid. The theory is advanced, although the present invention is not limited to such a theory, that evidently the temperature within the drill hole which is between about 80° C. and about 200° C. and the pressure therein of 200 atm. gauge and more, cause conversion of the magnesite $MgCO_3$ into magnesium hydroxide $Mg(OH)_2$.

In order to prevent that the drilling fluid according to the present invention loses its effectivness by exposure to acid reactants such as acidic gases, for instance, hydrogen sulfide, the reaction of the fluid can be adjusted to an alkaline reaction, for instance, to a pH between about 8.0 and about 12.0 by the addition of calcium hydroxide $(Ca(OH)_2)$.

The drilling fluids according to the present invention are not only inexpensive but, as a result of their use, a filter cake formed in the drill hole from such a drilling fluid, can readily be dissolved by pumping an acid, such as hydrochloric acid, into the drill hole. Thus the use of the drilling fluid according to the present invention permits to readily eliminate clogging and obstruction of the oil, gas or the like deposit tapped by drilling.

As stated above, not only naturally occurring magnesite can be used as component of the drilling fluid according to the present invention, but also magnesium carbonate as it is produced synthetically.

DESCRIPTION OF THE PREFERRED EMBODIMENTS

The following examples serve to illustrate the present invention without, however, limiting the same thereto.

EXAMPLE 1

The drilling fluid contains in one liter of water:

180 g. of magnesium chloride $MgCl_2.6 H_2O$,
120 g. of sodium chloride NaCl,
40 g. of magnesite $MgCO_3$, and
10 g. of ammonium chloride $NH_4Cl$.

EXAMPLE 2

The drilling fluid contains in one liter of water:

150 g. of magnesium chloride $MgCl_2.6 H_2O$,
130 g. of sodium chloride NaCl,
45 g. of magnesite $MgCO_3$, and
10 g. of ammonium chloride $NH_4Cl$.

Its pH-value is adjusted to a pH of 10.0 by the addition of 5 g. of calcium hydroxide.

EXAMPLE 3

The drilling fluid contains in one liter of water:

350 g. of magnesium chloride $MgCl_2.6 H_2O$,
70 g. of potassium chloride,
30 g. of calcium chloride,
70 g. of sodium chloride,
70 g. of magnesium sulfate,
45 g. of polyvinyl pyrrolidone,
10 g. of ammonium chloride, and
45 g. of magnesium carbonate.

5 g. of calcium hydroxide or 10 g. of diethanolamine are added thereto to adjust the pH-value of the drilling fluid to a pH of 10.0.

In place of polyvinyl pyrrolidone there can be added the same amount of urea-formaldehyde condensation products or of ethylene-urea-formaldehyde polymers.

EXAMPLE 4

The drilling fluid contains in one liter of water:

2000 g. of magnesium chloride $MgCl_2.6 H_2O$,
300 g. of strontianite,
60 g. of carboxy methyl cellulose,
50 g. of magnesium carbonate,
12 g. of ammonium chloride, and
3 g. of calcium hydroxide.

EXAMPLE 5

The drilling fluid contains in one liter of water:

750 g. of magnesium chloride $MgCl_2.6 H_2O$,
100 g. of barite,
40 g. of preswollen starch,
30 g. of magnesium carbonate,
6 g. of ammonium chloride, and
1.5 g. of calcium hydroxide.

The proportion of magnesium carbonate to ammonium chloride as given in the preceding examples can be varied as stated above.

The proportion of magnesium carbonate calculated as magnesium oxide to ammonium salt is about 4 moles of magnesium oxide to at least 1 mole of ammonium salt.

In place of ammonium chloride there can be used equivalent amounts of other ammonium salts such as ammonium sulfate, ammonium carbonate, or the like.

In place of calcium hydroxide or diethanolamine, there can be added monoethanolamine or triethanolamine or the like agents for the adjustment of the pH-value of the drilling fluid. The amounts of such agents are, of course, dependent on the acidity of the drilling fluid. In general, between about 0.1 percent and about 3 percent are sufficient to produce satisfactory alkalinization of the drilling fluid.

The drilling fluids according to the present invention do not require the addition of agents capable of regulating its viscosity.

I claim:

1. An aqueous drilling fluid free of drilling clay comprising a substantially saturated aqueous solution of a chloride or sulfate salt of magnesium, containing as drilling additives in amounts effective to provide deep drilling characteristics to the aqueous drilling fluid magnesium carbonate and a water soluble ammonium salt, the molar proportion of magnesium carbonate, calculated as magnesium oxide, to ammonium salt being about 4 moles of magnesium oxide to at least 1 mole of the ammonium salt.

2. The aqueous drilling fluid of claim 1, in which the ammonium salt is ammonium chloride.

3. The aqueous drilling fluid of claim 1, in which the magnesium carbonate is native magnesite.

4. The aqueous drilling fluid of claim 1, additionally containing calcium hydroxide in an amount sufficient to adjust the pH-value of the drilling fluid to a pH between about 8.0 and about 12.0.

5. An aqueous drilling fluid free of drilling clay, said drilling fluid being an aqueous solution of at least 150 g. of magnesium chloride $MgCl_2.6 H_2O$ per liter of drilling fluid and containing, in addition thereto, between about 30 g. and about 50 g. of magnesium carbonate and between about 6 g. and about 12 g. of ammonium chloride per liter of drilling fluid.

6. The aqueous drilling fluid of claim 5, additionally containing between about 0.1 percent and about 3 percent of an agent selected from the group consisting of calcium hydroxide and an alkanolamine to adjust the pH-value of the drilling fluid to a pH between about 8.0 and about 12.0.

7. the aqueous drilling fluid of claim 5 being a substantially saturated solution of a magnesium salt selected from the group consisting of magnesium chloride, a mixture of magnesium chloride and an alkali metal chloride, a mixture of magnesium chloride and calcium chloride, and magnesium sulfate, said drilling fluid containing, in addition to said magnesium salt, between about 30 g. and about 50 g. of magnesium carbonate and between about 6 g. and about 12 g. of an ammonium salt selected from the group consisting of ammonium chloride, ammonium sulfate, and ammonium carbonate.

8. The aqueous drilling fluid of claim 6 being a substantially saturated solution of a magnesium salt selected from the group consisting of magnesium chloride, a mixture of magnesium chloride and an alkali metal chloride, a mixture of magnesium chloride and calcium chloride, and magnesium sulfate, said drilling fluid containing, in addition to said magnesium salt, between about 30 g. and about 50 g. of magnesium carbonate and between about 6 g. and about 12 g. of an ammonium salt selected from the group consisting of ammonium chloride, ammonium sulfate, and ammonium carbonate.

* * * * *